US007690619B2

(12) United States Patent
Wolfersberger

(10) Patent No.: US 7,690,619 B2
(45) Date of Patent: Apr. 6, 2010

(54) APPARATUS FOR PIVOTALLY ORIENTING A PROJECTION DEVICE

(75) Inventor: Charles Wolfersberger, St. Louis, MO (US)

(73) Assignee: Stereotaxis, Inc., St. Louis, MO (US)

( * ) Notice: Subject to any disclaimer, the term of this patent is extended or adjusted under 35 U.S.C. 154(b) by 678 days.

(21) Appl. No.: 11/483,399

(22) Filed: Jul. 7, 2006

(65) Prior Publication Data

US 2007/0019330 A1 Jan. 25, 2007

Related U.S. Application Data

(60) Provisional application No. 60/698,541, filed on Jul. 12, 2005.

(51) Int. Cl.
*F16M 1/00* (2006.01)

(52) U.S. Cl. ....................... 248/652; 248/661; 248/664; 248/139

(58) Field of Classification Search ................. 248/652, 248/661, 664, 122.1, 139, 184.1, 284.1
See application file for complete search history.

(56) References Cited

U.S. PATENT DOCUMENTS 4,324,378 A * 4/1982 Groutage ................. 248/184.1
4,396,919 A * 8/1983 Speicher ...................... 343/765
4,580,461 A * 4/1986 Sears et al. ................ 74/490.1
5,419,521 A * 5/1995 Matthews ................ 248/278.1
6,014,580 A 1/2000 Blume et al.
6,015,414 A 1/2000 Werp et al.
6,148,823 A 11/2000 Hastings
6,157,853 A 12/2000 Blume et al.
6,212,419 B1 4/2001 Blume et al.
6,241,671 B1 6/2001 Ritter et al.
6,285,339 B1 * 9/2001 McGill ....................... 343/882
6,304,768 B1 10/2001 Blume et al.
6,330,467 B1 12/2001 Creighton, IV et al.
6,352,363 B1 3/2002 Munger et al.
6,459,924 B1 10/2002 Creighton, IV et al.
6,507,751 B2 1/2003 Blume et al.
6,531,990 B2 * 3/2003 Verkerk ...................... 343/882
6,537,196 B1 3/2003 Creighton, IV et al.
6,630,879 B1 10/2003 Creighton, IV et al.
6,677,752 B1 1/2004 Creighton, IV et al.
6,702,804 B1 3/2004 Ritter et al.

(Continued)

*Primary Examiner*—J. Allen Shriver, II
*Assistant Examiner*—Bradley H Duckworth
(74) *Attorney, Agent, or Firm*—Harness, Dickey & Pierce, P.L.C.

(57) ABSTRACT

An apparatus that provides for rotation about two axes orthogonal to each other includes a gimbal having two arms adjoining a portion that is mounted to a base for rotation about a first axis. A shaft defining a second axis orthogonal to the first pivotally couples a mounting plate to the arms. The mounting plate has an arcuate edge with first and second parallel grooves therein adapted to receiving a drive cable. A drive cable that is engaged with a drive pulley is aligned by at least one idler pulley with the first and second grooves of the mounting plate. The drive cable has opposing free ends that are received in the first and second grooves of the mounting plate. A motor is coupled to the drive pulley for controlling the drive cable travel, to accordingly rotate the mounting plate to provide for orientating a device in a desired direction.

21 Claims, 4 Drawing Sheets

U.S. PATENT DOCUMENTS

| | | | |
|---|---|---|---|
| 6,975,197 | B2 | 12/2005 | Creighton, IV |
| 6,981,684 | B1 * | 1/2006 | Wadsworth ................ 248/511 |
| 7,019,610 | B2 | 3/2006 | Creighton, IV et al. |
| 2001/0038683 | A1 | 11/2001 | Ritter et al. |
| 2004/0019447 | A1 | 1/2004 | Shachar |
| 2004/0064153 | A1 | 4/2004 | Creighton, IV et al. |
| 2004/0199074 | A1 | 10/2004 | Ritter et al. |
| 2004/0249262 | A1 | 12/2004 | Werp et al. |
| 2004/0249263 | A1 | 12/2004 | Creighton, IV |
| 2005/0096589 | A1 | 5/2005 | Shachar |
| 2005/0113628 | A1 | 5/2005 | Creighton, IV et al. |
| 2006/0114088 | A1 | 6/2006 | Shachar |
| 2006/0116633 | A1 | 6/2006 | Shachar |

* cited by examiner

APPARATUS FOR PIVOTALLY ORIENTING A PROJECTION DEVICE

CROSS-REFERENCE TO RELATED APPLICATIONS

This application claims the benefit of U.S. Provisional Patent Application Ser. No. 60/698,541, filed Jul. 12, 2005, the entire disclosure of which is incorporated herein by reference.

FIELD OF THE INVENTION

The present invention relates to an apparatus on which a load may be mounted to provide at least two rotational axes about which the load may be pivoted for pointing the load in a desired direction.

BACKGROUND OF THE INVENTION

Various apparatus that permit rotation about one or more axes, such as gimbal assemblies, have been utilized as pointing devices for mounting radar antennas, optical transducers and other components that require general direction pointing control. Such pointing devices often have a significant mass associated with complex gears and drive motors for controlling the movement of the pointing device, which creates a high inertial load and limits the amount of weight that may be mounted on the device. The complexity of the components also requires more advanced circuitry for controlling the movement of the pointing device.

SUMMARY OF THE INVENTION

The various embodiments of the present invention provide a directional pointing apparatus comprising a simplified drive mechanism. In one embodiment, an apparatus for controllably orienting a component in a desired direction is provided that has a gimbal bracket having two laterally spaced arms adjoining a base portion that is mounted to a support base for rotation about a first axis extending through the base portion of the gimbal bracket. The first embodiment includes a mounting plate disposed between the laterally spaced arms of the gimbal bracket. The mounting plate has an arcuate edge portion with first and second parallel grooves therein adapted to receiving a drive cable. A pivot shaft is provided for pivotally coupling the mounting plate to the laterally spaced arms of the gimbal bracket, where the pivot shaft defines a second axis orthogonal to the first axis. The apparatus further comprises a drive cable that is engaged with a drive pulley and has opposing ends aligned by at least one idler pulley with the first and second grooves of the mounting plate. The opposing free ends are received in the first and second grooves of the mounting plate, and are secured to the mounting plate. A drive motor is coupled to the drive pulley for controllably rotating the drive pulley to displace the drive cable and rotate the mounting plate about the second axis. The apparatus accordingly provides for mounting at least one component to the mounting plate, and for rotating the at least one component about at least two axes orthogonal to each other to be oriented in a desired direction.

In another embodiment, an apparatus is provided for controllably orienting at least one magnetic field generating device in a desired direction. The apparatus includes a first generally u-shaped member having a base portion and two laterally spaced arms extending therefrom, where the u-shaped member is adapted to be rotatably mounted to a support base for rotation about a first axis extending through the base portion of the u-shaped member. A shaft is disposed between the two laterally spaced arms defines a second axis orthogonal to the first axis. A mounting plate is coupled to the shaft for rotation about the shaft, and has an arcuate edge portion with a first and second parallel grooves serving as guideways for receiving a drive cable. The apparatus of this embodiment further comprises a drive pulley having a plurality of helical tracks for receiving at least one drive cable, and at least one drive cable secured to the drive pulley. The at least one drive cable has opposing free ends that are each respectively received into the first and second guideways in the arcuate edge of the mounting plate. The opposing free ends of the drive cable are each received in the guideways and secured to the mounting plate. A first idler pulley and a second idler pulley are provided for respectively aligning the drive cable ends with the first guideway and the second guideway in the mounting plate. A reversible drive motor coupled to the drive pulley provides for controllably rotating the drive pulley to move the drive cable, to cause the mounting plate to rotate about the second axis. At least one magnetic field generating device is mounted to the mounting plate for applying a magnetic field in a predetermined direction. The at least one magnetic field generating device accordingly may be rotated about at least two axes orthogonal to each other to controllably orient the magnetic field in a desired direction.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Corresponding reference numerals indicate corresponding parts throughout the several views of the drawings.

DETAILED DESCRIPTION OF THE EMBODIMENTS

Figure 1:
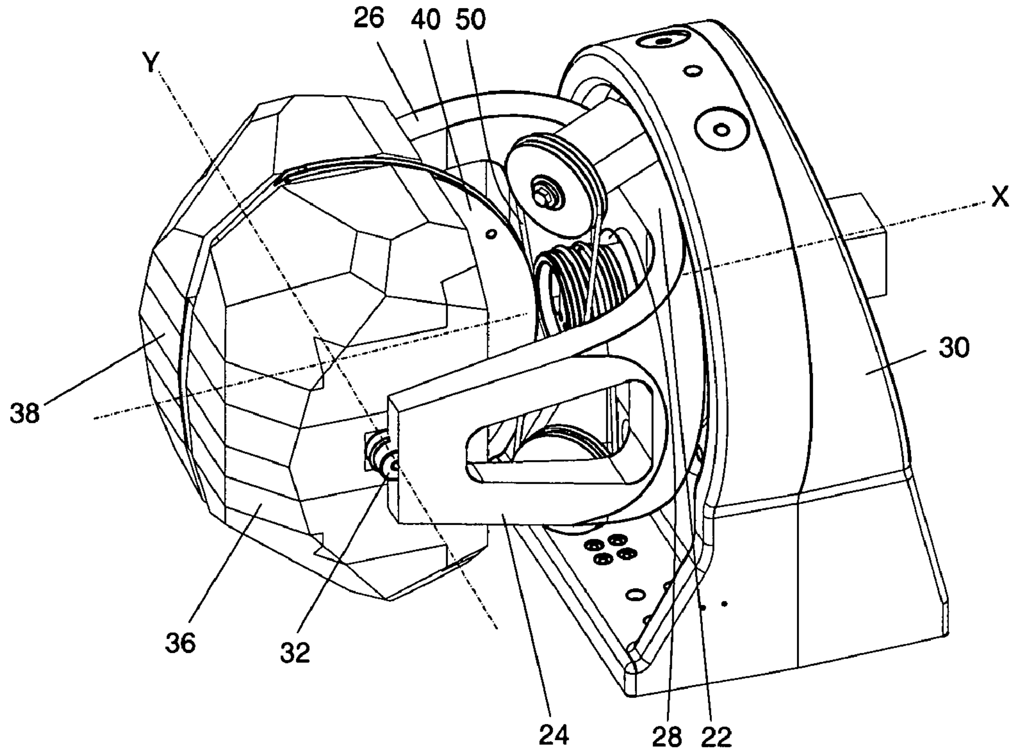
FIG. 1 is an isometric view of one embodiment of an apparatus for rotatably pointing a device in a desired direction.

The following description of the various embodiments are merely exemplary in nature and are in no way intended to limit the invention, its application, or uses.

In one embodiment, an apparatus 100 for controllably orienting a component in a desired direction is provided that comprises a gimbal bracket 20 that is assembled or rotatably mounted to a base 30 for rotation about a first "X" axis. Such rotation may be provided by a drive motor for engaging a gear or track on the gimbal bracket, to provide a full 360 degrees of rotation of the gimbal bracket about the "X" axis. The half-ring gimbal bracket 20 comprises a base portion 22, and laterally spaced, generally parallel arms 24 and 26 extending from the base portion 22 of the gimbal bracket to define a generally U-shaped gimbal member. A second "Y" axis extends through the two gimbal arms 24 and 26, which "Y" axis is orthogonal to the first "X" axis. A mounting plate 40 is pivotally coupled to the gimbal bracket 20 between the gimbal arms 24 and 26, and is rotatable about the second "Y" axis orthogonal to the first "X" axis. The gimbal bracket 20 further comprises an opening 28 in the center of the gimbal base 22, through which the first "X" axis extends. Extending transversely between the gimbal arms 24 and 26 is a trunnion or pivotal shaft 32, the longitudinal centerline of which defines the second 'Y' axis that is orthogonal to the first "X" axis. The mounting plate 40 disposed between the gimbal arms 24 and 26 is preferably coupled to the pivotal shaft 32, to allow the mounting plate 40 to pivot about the second 'Y' axis. A drive motor (not shown) is preferably coupled to the base 30 to provide for rotation of the gimbal bracket 20 about the first 'X' axis, and a motor driven pulley cable 50 is preferably connected between the mounting plate 40 and the gimbal bracket 20 to provide for rotation of the mounting plate 40 about the second "Y" axis. The apparatus 100 accordingly may be rotated about at least two rotational axes orthogonal to each other to provide for directional orientation of a load (such as magnetic elements 36 and 38, for example).

Figure 2:
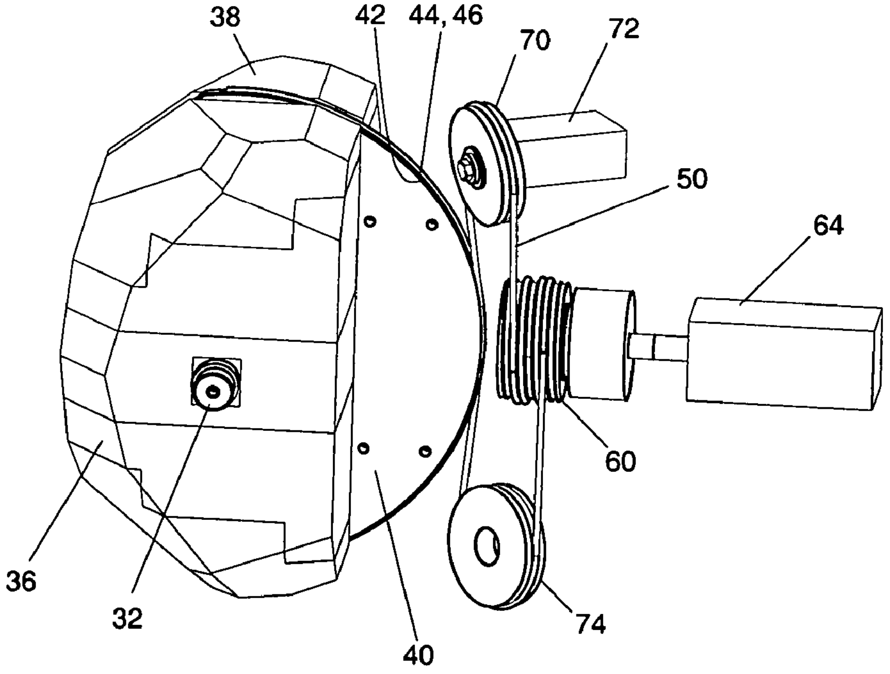
FIG. 2 is an isometric view of the drive cable assembly of a first embodiment, for rotating a mounting plate having a magnetic field generating device mounted thereon.
Figure 3:
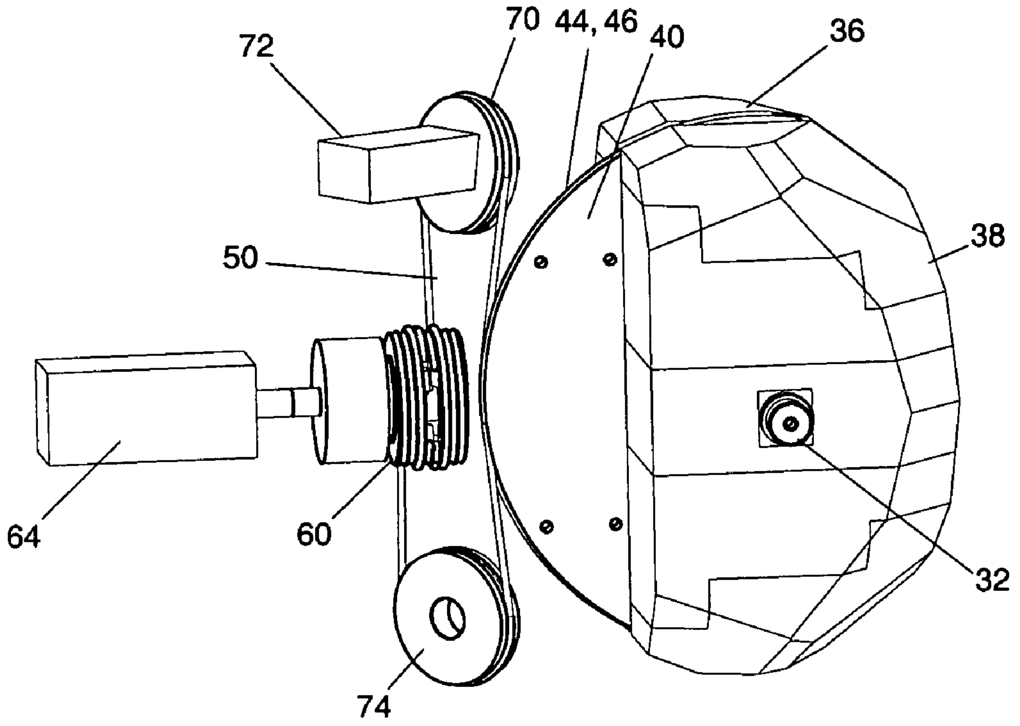
FIG. 3 is a far side isometric view of the assembly in FIG. 2.

Referring to FIGS. 2 and 3, the component mounting plate 40 is adapted to receive a load (for example, permanent magnet elements), and has a generally arcuate-shaped edge portion 42 having a first and second parallel grooves 44, 46 therein for receiving a drive cable 50. The generally arcuate-shaped edge portion 42 has a radial center at or approximately concentric with the "Y" axis. The first and second grooves 44 and 46 in the arcuate edge portion 42 are of a sufficient depth to substantially receive the drive cable 50, and both serve as guideways for receiving the respective cable ends 52 and 54 of the drive cable 50 throughout the rotation of the mounting plate 40 about the "Y" axis. The mounting plate 40 may comprise a transverse opening 48 for receiving a trunnion or shaft 32 about which the mounting plate 40 may pivot. In this embodiment, the mounting plate 40 preferably comprises a square opening 48 for receiving a square shaft 34 having trunnions 32 at each end that are pivotally secured to the gimbal bracket arms 24 and 26. Alternatively, the mounting plate 40 may comprise a generally round opening 48 for receiving a cylindrical shaft, or may integrally comprise a pair of trunnions 32 extending transversely from each side of the mounting plate 40 to the gimbal bracket arms 24 and 26.

Figure 4:
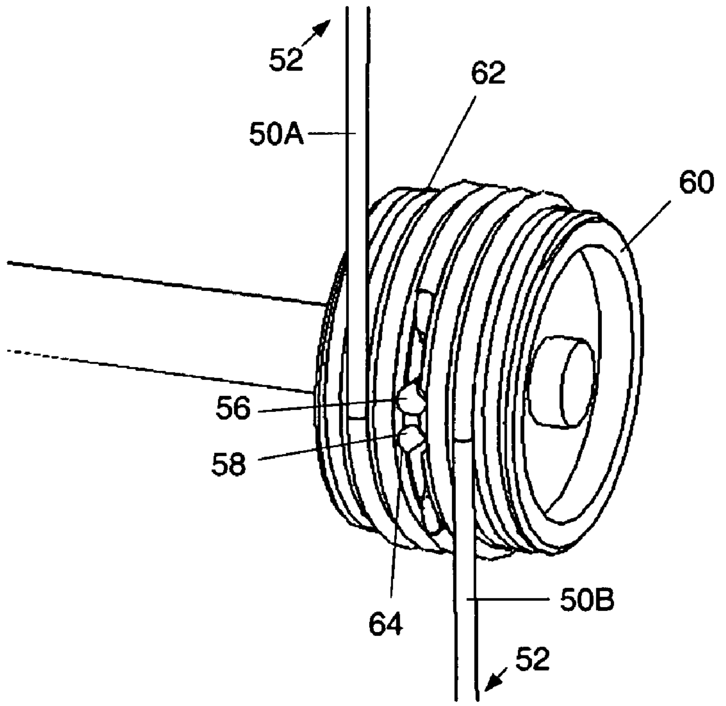
FIG. 4 is an isometric view of the drive pulley in FIG. 2.
Figure 5:
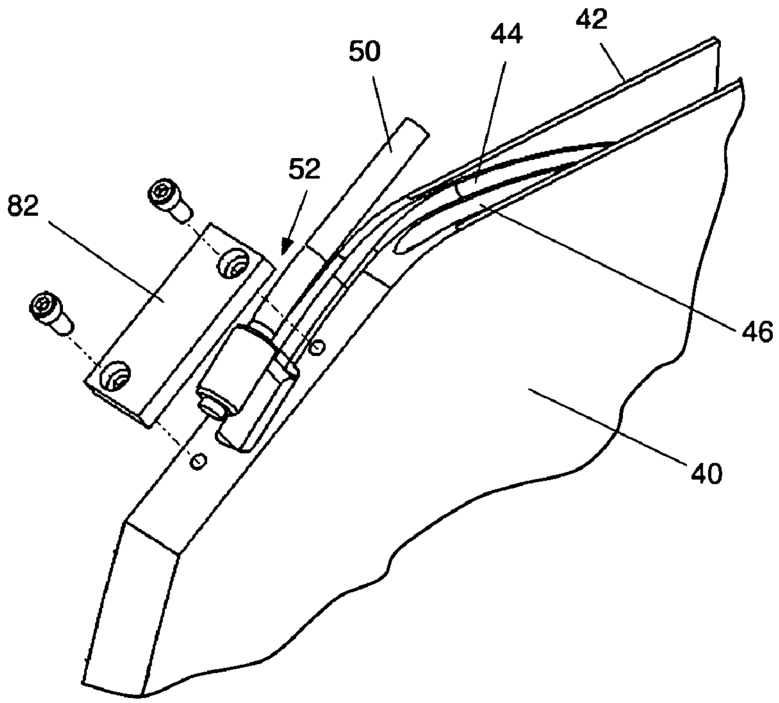
FIG. 5 is a cut-away view of the mounting plate and drive cable end to be anchored to the mounting plate.
Figure 6:
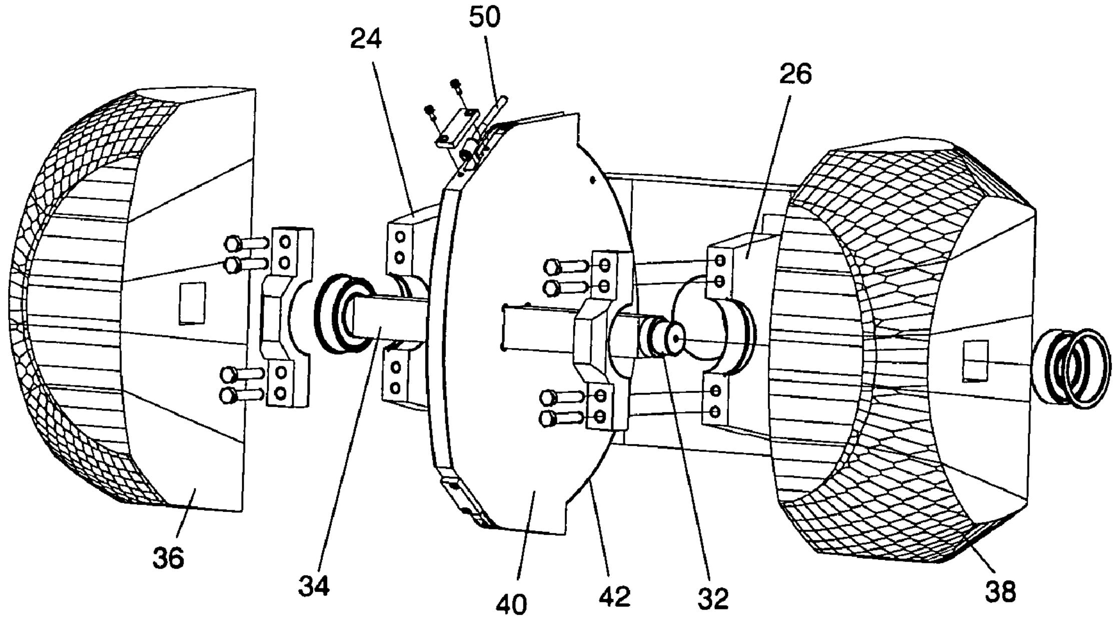
FIG. 6 is an exploded view of the gimbal bracket, pivot shaft, mounting plate and at least one magnetic field generating device to be assembled to the mounting plate.

The apparatus 100 shown in FIGS. 2 and 3 further comprises a motor driven pulley cable 50 that is preferably connected between the mounting plate 40 and a drive pulley 60 mounted on the gimbal base 22 to provide for rotation of the mounting plate 40 about the second "Y" axis. The apparatus 100 comprises a drive pulley 60 having a plurality of helical tracks 62 for receiving and engaging the drive cable 50. In one embodiment, the drive pulley 60 preferably engages the drive cable 50 by means of an anchor 66 within a track 62 that an end of the drive cable 50 is fixed or secured to. In one embodiment, the drive cable 50 may be one continuous cable that is secured to the drive pulley 60 by a clamping means in one of the helical tracks 62. In another embodiment as shown in FIG. 4, two drive cables 50A and 50B are employed, each of which have ends configured to be anchored within a track 62 of the drive pulley 60. The first drive cable 50A has a free end 52 and an end 56 configured to be anchored within a track 62 of the drive pulley 60 as shown in FIG. 4. The second drive cable 50B also has a free end 54 and an end 58 configured to be anchored within a track 62, such that each of the drive cables 50A and 50B are wrapped around the helical tracks 62 to provide a drive pulley assembly with a coiled drive cable 50 having opposing free ends 52 and 54. The anchor means may comprise a slot for receiving a swedged end on the drive cable and a locking screw, or any other suitable means for securing the drive cable to the drive pulley. The use of two drive pulleys 50A and 50B has the added advantage of eliminating the possibility of the drive cable 50 slipping relative to the helical track 62, to control drive cable movement relative to pulley rotation for providing reliable rotation and positioning of the mounting plate 40 about the "Y" axis. In this embodiment using two drive pulleys 50A and 50B, the motor can quickly reverse directions to rotate the mounting plate in an opposite direction without the mass of the mounting plate causing the drive cable to slip against the drive pulley 50. Either embodiment provides an assembly of a drive pulley 60 with a coiled drive cable 50 having opposing free ends 52 and 54, where one free end 52 is being wound while the other free end 54 unwinds when the drive pulley 60 is rotated in a first direction, and one free end 52 respectively unwinds while the other free end 54 is being wound when the drive pulley 60 is rotated in the second direction opposite the first direction. The drive pulley 60 winds and unwinds the respective opposing cable ends 52 and 54 that are anchored to the mounting plate 40 along the arcuate edge 44, to provide for rotation of the mounting plate about the "Y' axis. As shown in FIG. 5, the free ends 52 and 54 of the drive pulley 60 are preferably secured within the first and second guideways 44 and 46 of the mounting plate 40 by an anchor on the end of the drive cable that is received in pockets on opposing ends of the guideways 44 and 46. A plate 82 provides for retaining the anchor on the free ends 52 and 54 within the guideways 44 and 46, as shown in FIG. 5. The drive pulley comprises a minimum number of helical track turns and a large enough diameter for accommodating a sufficient length of drive cable for effectively rotating the mounting plate 40 up to about 45 degrees. The drive pulley preferably comprises at least five helical tracks about which the drive cable is wound and unwound to allow the mounting plate 40 to rotate about at least 45 degrees in either direction from the neutral position shown in FIG. 3. Accordingly, a single drive pulley 60 provides for rotating the mounting plate 40 in either direction about the "Y" axis, for pointing the mounting plate and at least one component attached to the mounting plate in a desired direction.

The apparatus 100 shown in FIGS. 2 and 3 further comprises at least one idler pulley 70 for maintaining tension and for aligning the drive cable 50 with at least one guideway 44, 46 on the arcuate edge 42 of the mounting bracket 40 that is adapted to receive the drive cable 50. The apparatus 100 preferably comprises at least two idler pulleys 70 and 74 for aligning the opposing free ends 52 and 54 of the drive cable 50 with the first and second guideways 44, 46 in the arcuate edge 42 of the mounting plate 40. Alternatively, the drive pulley 60 could be mounted such that the drive cable 50 extending from the drive pulley 60 is aligned with a first guideway 44 or 46 on the arcuate edge 42 of the mounting bracket 40, such that only one idler pulley 70 is required. The at least two idler pulleys 70 and 74 are preferably mounted by means of adjustable brackets 72 and 76 extending from the gimbal bracket 20. The first idler pulley 70 shown in FIG. 3 is mounted to a first bracket 72 that is secured to the gimbal bracket 20. The second idler pulley 74 is mounted to a second bracket 76. The opposing free ends 52 and 54 of the drive cable 50 engaging the drive pulley 60 are each aligned by the first and second idler pulleys 70 and 74 respectively with the first and second guideways 44 and 46, in which the respective free ends 52 and 54 are preferably secured by means of at least one slot 64 for anchoring each of the ends 52 and 54. The first and second idler pulleys 70 and 74 that align the drive cable permit the drive pulley 60 to be positioned out of alignment with the first and second guideways 44 and 46, such that the drive pulley 60 may be more conveniently mounted to the gimbal bracket 20 through the opening 28 in the gimbal base 22.

The apparatus 100 further comprises a reversible drive motor 64 coupled to the drive pulley 60 for controllably rotating the drive pulley 60 to displace the drive cable 50 in either direction and rotate the mounting plate 40 about the second "Y" axis. The mounting plate 40 is accordingly configured to rotate about the pivot shaft 34 defining the second "Y" axis as the drive cable 50 is wound and unwound onto the drive pulley 60 when the drive motor 64 is actuated to rotate the drive pulley. The drive motor is preferably a servo-driven motor capable of being controllably rotated incrementally in either rotational direction. Thus, the drive motor may be selectively actuated to rotate in either a first direction or a second direction opposite the first direction, to cause the mounting plate 40 to be rotated up or down respectively about the pivot shaft 34.

Figure 7:
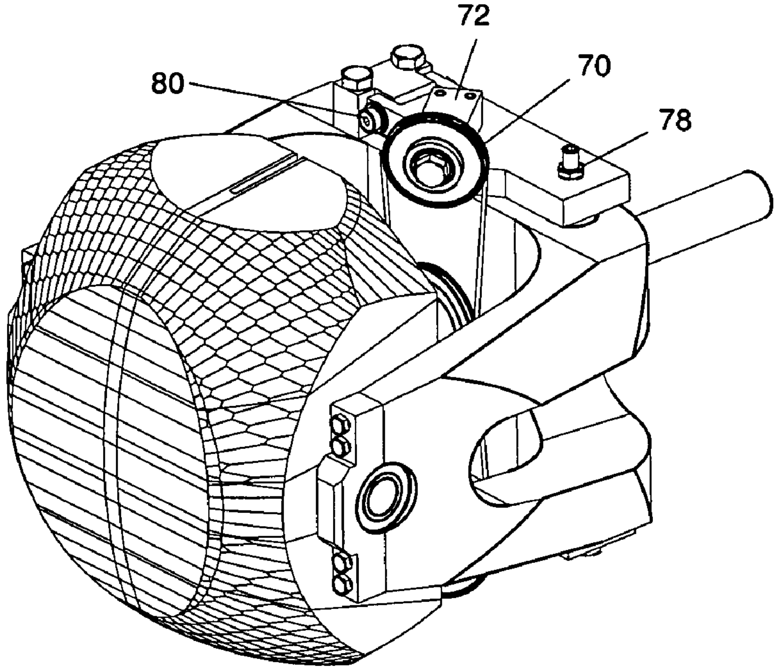
FIG. 7 is an isometric view of another embodiment of the apparatus having a first adjustable pulley mounting bracket.
Figure 8:
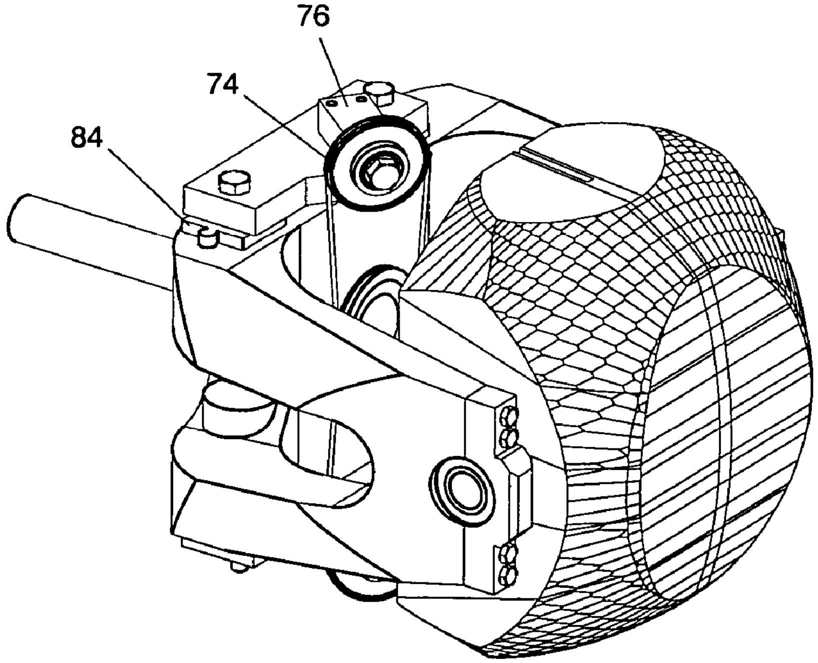
FIG. 8 is an isometric view of another embodiment of the apparatus having a second adjustable pulley mounting bracket.

In some embodiments, the idler pulleys 70 and 74 further comprise mounting brackets 72 and 74 respectively that provide adjustment means for varying the tension on the drive cable 50, as shown in FIGS. 7 and 8. In FIG. 7, the bracket 72 comprises at least a first adjustable screw 78 for adjusting or elevating the position of the bracket 72 relative to the gimbal bracket 20. The bracket 72 may further comprise a second screw 80 for adjusting the position of the bracket 72 relative to the top of the gimbal bracket 20. One or more hold down bolts may further be provided to secure the bracket 72 to the gimbal bracket 20. Likewise, bracket mount 67 may further comprise a shim plate 84 to provide for adjustment of the second idler pulley 74 relative to the gimbal bracket 20.

Various components may be attached or secured to the mounting plate of the apparatus, to provide for controllably pointing the component in a desired direction. For example, in one embodiment, at least one magnetic field generating device may be mounted to the mounting plate 40, to provide for controllably orienting the direction of the magnetic field generated by the device in a desired direction. The magnetic field generating device may be an electromagnetic coil device, or alternatively a permanent magnet assembly. The at least one magnetic field generating device preferably comprises at least two permanent magnet assemblies 36 and 38, which are capable of applying a magnetic field in a predetermined direction. By mounting the at least two permanent magnets 36 and 38 to the mounting plate 40, the at least two permanent magnets may be rotated about at least two axes orthogonal to each other to controllably orient the magnetic field provided by the at least two permanent magnets in a desired direction.

Other embodiments may comprise optical transducers that are suitably affixed or secured to either side of the mounting plate 40, such that the optical transducers may be controllably oriented in a desired direction to transmit or receive an optical wave signal. Alternatively, other embodiments of the present apparatus may be employed for mounting a radar antenna to the mounting plate, for controllably orientating the radar antenna in a desired direction to provide for tracking of moving objects.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus for controllably orienting a component in a desired direction, the apparatus comprising:

a gimbal bracket having two laterally spaced arms adjoining a base portion of the gimbal bracket, which is mounted for rotation about a first axis extending through the base portion of the gimbal bracket;

a mounting plate disposed between the laterally spaced arms of the gimbal bracket, the mounting plate having an arcuate edge portion with first and second parallel grooves therein that define first and second parallel guideways alongside each other, which are adapted to receive opposing first and second ends of a drive cable;

a pivot shaft pivotally coupling the mounting plate to the laterally spaced arms of the gimbal bracket, the pivot shaft defining a second axis orthogonal to the first axis about which the mounting plate pivots;

a drive pulley;

at least one idler pulley;

a drive cable engaged with the drive pulley and supported by the at least one idler pulley, the drive cable having opposing first and second ends that are each respectively received into the first and second parallel guideways of the mounting plate and are respectively secured on opposing ends of the first and second parallel guideways;

a drive motor coupled to the drive pulley for controllably rotating the drive pulley to displace the drive cable and rotate the mounting plate about the second axis; and at least one component mounted to the mounting plate, wherein the at least one component may be rotated about at least two axes orthogonal to each other to be oriented in a desired direction.

2. The apparatus of claim 1 further comprising a drive motor coupled to the base for controllably rotating the gimbal bracket about the first axis such that the component on the mounting plate may be rotated about at least two rotational axis orthogonal to each other to provide for orientation of the component in a desired direction.

3. The apparatus of claim 1 wherein the first and second parallel grooves in the arcuate edge of the mounting plate define first and second parallel guideways for receiving the respective opposing ends of the drive cable when the mounting plate is rotated about the second axis.

4. The apparatus of claim 1 wherein the drive pulley comprises a plurality of helical tracks for receiving and engaging the drive cable.

5. The apparatus of claim 4 wherein the drive pulley comprises at least one track in the drive pulley for securing at least two drive cables having first and second ends respectively, and anchors on the first and second ends that are secured within at least one track, wherein the at least two drive cables are coiled around the helical tracks of the drive pulley to provide a drive pulley assembly with two drive cables having opposing first and second free cable ends that are secured on opposing ends of the first and second parallel guideways of the mounting plate, to prohibit the mounting plate from rotating beyond the limit of the first and second free ends.

6. The apparatus of claim 5 where the first free end is being wound while the second free end unwinds when the pulley is rotated in a first direction, and the first free end respectively unwinds while the second free end is being wound when the pulley is rotated in the second direction opposite the first direction.

7. The apparatus of claim 6 wherein the apparatus comprises at least two idler pulleys for aligning the opposing free cable ends with the first and second grooves in the actuate edge of the mounting plate.

8. The apparatus of claim 2 wherein the at least one component comprises a pair of permanent magnets.

9. An apparatus for controllably orienting a component in a desired direction, the apparatus comprising:

a first generally u-shaped member having a base portion and two laterally spaced arms extending therefrom, the u-shaped member being adapted to be rotatably mounted to a base for rotation about a first axis;

a shaft between the two laterally spaced arms, the longitudinal axis of the shaft defining a second axis orthogonal to the first axis;

a mounting plate disposed on the shaft defining the second axis, about which the mounting plate may pivot, the mounting plate having a curved edge portion with first and second parallel grooves therein defining first and second parallel guideways alongside each other;

a drive pulley;

at least one idler pulley;

a drive cable engaged with the drive pulley and supported by the at least one idler pulley, the drive cable having opposing ends that are each respectively received into the first and second grooves defining the first and second parallel guideways in the mounting plate and are respectively secured on opposing ends of the first and second parallel guideways;

a reversible drive motor coupled to the drive pulley for controllably rotating the drive pulley to move the drive cable to cause the mounting plate to rotate about the second axis; and at least one component mounted to the mounting plate, wherein the at least one component may be rotated about at least two axes orthogonal to each other to be oriented in a desired direction.

10. The apparatus of claim 9 further comprising a drive motor coupled to the base for controllably rotating the gimbal bracket about the first axis such that the component on the mounting plate may be rotated about at least two rotational axis orthogonal to each other to provide for orientation of the component in a desired direction.

11. The apparatus of claim 9 wherein the first and second parallel grooves in the arcuate edge of the mounting plate define first and second parallel guideways for receiving the respective opposing ends of the drive cable when the mounting plate is rotated about the second axis.

12. The apparatus of claim 9 wherein the drive pulley comprises a plurality of helical tracks for receiving the drive cable.

13. The apparatus of claim 12 wherein the drive pulley comprises at least one track in the drive pulley for securing at least two drive cables having first and second ends respectively, and anchors on the first and second ends that are secured within at least one track, wherein the at least two drive cables are coiled around the helical tracks of the drive pulley to provide a drive pulley assembly with two drive cables having opposing first and second free cable ends that are secured on opposing ends of the first and second parallel guideways of the mounting plate, to prohibit the mounting plate from rotating beyond the limit of the first and second free ends.

14. The apparatus of claim 13 where the first free end is being wound while the second free end unwinds when the pulley is rotated in a first direction, and the first free end respectively unwinds while the second free end is being wound when the pulley is rotated in the second direction opposite the first direction.

15. The apparatus of claim 14 wherein the apparatus comprises at least two idler pulleys for aligning the opposing free cable ends with the first and second grooves in the actuate edge of the mounting plate.

16. An apparatus for controllably orienting at least one permanent magnet to provide a magnetic field in a desired direction, the apparatus comprising:

a first generally u-shaped member having a base portion and two laterally spaced arms extending therefrom, the u-shaped member being adapted to be rotatably mounted to a base for rotation about a first axis extending through the base portion of the u-shaped member;

a shaft between the two laterally spaced arms, the shaft having a longitudinal axis that defines a second axis orthogonal to the first axis;

a mounting plate coupled to the shaft defining the second axis about which the mounting plate pivots, the mounting plate having an arcuate edge portion with a first and second parallel grooves therein that define first and second parallel guideways alongside each other for receiving opposing first and second ends of a drive cable;

a drive pulley having a plurality of helical tracks for receiving at least one drive cable;

at least one drive cable secured to the drive pulley, the at least one drive cable having opposing first and second free ends that are each respectively received into the first and second parallel guideways in the arcuate edge of the mounting plate, where the opposing first and second free ends of the drive cable are respectively secured to opposing ends of the first and second parallel guideways in the mounting plate;

a first idler pulley and a second idler pulley for respectively aligning, the drive cable with the first guideway and the second guideway in the mounting plate;

a reversible drive motor coupled to the drive pulley for controllably rotating the drive pulley to move the drive cable to cause the mounting plate to rotate about the second axis; and at least one magnetic field generating device being mounted to the mounting plate for applying a magnetic field in a predetermined direction, wherein the at least one magnetic field generating device may be rotated about at least two axes orthogonal to each other to controllably orient the magnetic field in a desired direction.

17. The apparatus of claim 16 wherein the at least one drive cable preferably comprises two drive cables having first and second free ends that are rigidly anchored within at least one helical track of the drive pulley for securing the two drive cables therein, such that the two drive cables will not slip with respect to the drive pulley track to control drive cable movement relative to pulley rotation for providing reliable rotation and positioning of the mounting plate.

18. The apparatus of claim 17 where the first free end is being wound while the second free end unwinds when the pulley is rotated in a first direction, and the first free end respectively unwinds while the second free end is being wound when the pulley is rotated in the second direction opposite the first direction.

19. The apparatus of claim 18 wherein the first and second idler pulleys provide for respectively aligning the opposing first and second free ends of the drive cable with the first and second parallel guideways on the mounting plate, such that the drive pulley may be mounted to the generally u-shaped member in a position that is out of alignment with the first and second guideways.

20. The apparatus of claim 18 wherein the drive motor may be selectively actuated in either the first or second direction for moving the drive cable to rotate the at least one magnetic field generating device to point in a desired direction.

21. The apparatus of claim 20 wherein the at least one magnetic field generating device comprises a permanent magnet capable of applying a magnetic field in a predetermined direction being mounted to the mounting plate, wherein the at least one permanent magnet may be rotated about at least two axes orthogonal to each other to controllably orient the magnetic field in a desired direction.

* * * * *